(12) United States Patent
Bamba

(10) Patent No.: US 12,197,497 B2
(45) Date of Patent: Jan. 14, 2025

(54) IMAGE PROCESSING APPARATUS FOR SEARCH OF AN IMAGE, IMAGE PROCESSING METHOD AND STORAGE MEDIUM

(71) Applicant: CANON KABUSHIKI KAISHA, Tokyo (JP)

(72) Inventor: Yasuo Bamba, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/481,264

(22) Filed: Oct. 5, 2023

(65) Prior Publication Data
US 2024/0152549 A1 May 9, 2024

(30) Foreign Application Priority Data
Nov. 9, 2022 (JP) .................. 2022-179814

(51) Int. Cl.
  *G06F 16/00* (2019.01)
  *G06F 16/532* (2019.01)
  (Continued)

(52) U.S. Cl.
  CPC .......... *G06F 16/583* (2019.01); *G06F 16/532* (2019.01); *G06F 16/55* (2019.01);
  (Continued)

(58) Field of Classification Search
  CPC ...... G06F 16/583; G06F 16/55; G06F 16/532; G06F 16/5846; G06F 16/535;
  (Continued)

(56) References Cited

U.S. PATENT DOCUMENTS

| 7,912,246 B1 * | 3/2011 | Moon | G06F 18/24 |
| | | | 382/118 |
| 8,406,525 B2 * | 3/2013 | Ma | G06F 18/2413 |
| | | | 704/236 |

(Continued)

FOREIGN PATENT DOCUMENTS

| JP | 2020-052822 A | 4/2020 |
| WO | WO2004059573 A2 * | 7/2004 |
| WO | WO 2016037844 A1 * | 3/2016 |

OTHER PUBLICATIONS

Mangala B.S Divya et al., "Facial Expression Recognition by Calculating Euclidian Distance for Eigen FacesUsing PCA", 2018 International Conference on Communication and Signal Processing (ICCSP), Nov. 2018, pp. 0244-0248.*

(Continued)

*Primary Examiner* — Srirama Channavajjala
(74) *Attorney, Agent, or Firm* — Carter, DeLuca & Farrell LLP

(57) ABSTRACT

An image processing apparatus is configured to acquire a query image including a subject that is a search target, and an image to be searched, extract a first feature vector that represents features of the search target included in the query image, extract a feature vector map that represents feature vectors of a subject at each position of the image to be searched, perform an arithmetic operation based on the first feature vector and the feature vector map to obtain a heat map that represents the likelihood that the search target is present.

8 Claims, 11 Drawing Sheets

(51) Int. Cl.
*G06F 16/55* (2019.01)
*G06F 16/583* (2019.01)
*G06N 20/00* (2019.01)
*G06T 7/70* (2017.01)
*G06V 10/44* (2022.01)
*G06V 10/772* (2022.01)
*G06V 10/82* (2022.01)

(52) U.S. Cl.
CPC ............... *G06N 20/00* (2019.01); *G06T 7/70* (2017.01); *G06V 10/44* (2022.01); *G06V 10/772* (2022.01); *G06V 10/82* (2022.01)

(58) Field of Classification Search
CPC ...... G06F 16/54; G06F 16/316; G06F 16/387; G06F 16/58; G06T 7/70; G06V 10/44; G06V 10/40; G06V 10/454; G06V 10/761; G06V 10/772; G06V 30/19147; G06V 30/19173; G06V 30/1918; G06N 3/049; G06N 3/084; G06N 20/00
See application file for complete search history.

(56) References Cited

U.S. PATENT DOCUMENTS

| | | | |
|---|---|---|---|
| 11,106,896 B2* | 8/2021 | Hu | G06V 10/82 |
| 11,587,288 B2* | 2/2023 | Wang | G06N 3/0464 |
| 2008/0260257 A1* | 10/2008 | Rose | B82Y 10/00 |
| | | | 382/195 |
| 2010/0135584 A1* | 6/2010 | Tang | G06F 16/583 |
| | | | 382/218 |
| 2012/0140982 A1* | 6/2012 | Sukegawa | G06V 10/772 |
| | | | 382/103 |
| 2021/0287374 A1 | 9/2021 | Bamba | |
| 2021/0406996 A1* | 12/2021 | Yu | G06V 40/172 |
| 2022/0164380 A1* | 5/2022 | Lin | G06F 16/532 |

OTHER PUBLICATIONS

Deng, J. et al., "ArcFace Additive Angular Margin Loss for Deep Face Recognition" CVPR (Jun. 2019) pp. 4690-4699.

* cited by examiner

IMAGE PROCESSING APPARATUS FOR SEARCH OF AN IMAGE, IMAGE PROCESSING METHOD AND STORAGE MEDIUM

BACKGROUND OF THE INVENTION

Field of the Invention

The present invention relates to an image processing apparatus for search of an image, an image processing method and a storage medium.

Description of the Related Art

In recent years, there have been proposed many feature extraction techniques for performing advanced processing on an image of an object appearing in a captured image to extract useful information. Among the feature extraction techniques, in particular, techniques related to feature extractors that extract feature vectors of an object in an image by using a multi-level neural network called a deep network (also known as deep neural network, or deep learning) are being actively studied.

A feature extractor is trained by a technique called distance learning, for example. In distance learning, first, the distance between feature vectors is defined. The definition of the distance is the Euclidean distance or the cosine similarity, for example.

In distance learning, the feature extractor is trained to output feature vectors at a short distance from each other for images of an identical subject or subjects belonging to an identical class. In addition, the feature extractor is trained in advance so as to output feature vectors at a long distance from each other for images of non-identical objects or subjects that do not belong to an identical class.

One application example of distance learning is face authentication. The feature extractor is trained so as to output feature vectors at a short distance from each other for images of the same person, and at a long distance from each other for images of different people. A first face image and a second face image are each input to the feature extractor, and a first feature vector and a second feature vector are obtained.

By obtaining the distance between the first feature vector and the second feature vector and comparing the distance to a predetermined threshold value, it is possible to determine whether a person that appears in the first face image and a person that appears in the second face image are the same person or are different persons. A technique for implementing face recognition by using distance learning is disclosed in Deng et al, to be described later.

Another application example of distance learning is vehicle identity determination. The feature extractor is trained such that the feature vectors that are at a short distance from each other are output for images of the same vehicle type, and feature vectors that are at a long distance from each other are output for images of different vehicle types. An image of a first vehicle and an image of a second vehicle are each input to the feature extractor, and a first feature vector and a second feature vector are obtained.

By obtaining the distance between the first feature vector and the second feature vector and comparing that distance to a predetermined threshold value, it is possible to determine whether the vehicle that appears in the first vehicle image and the vehicle that appears in the second vehicle image are the same vehicle type or different vehicle types. Although in a method that determines a vehicle type by a classifier that performs classification of vehicle types it is necessary to retrain the classifier when a new vehicle type has been released, it is also possible to respond to new vehicle types without retraining the feature extractor by adopting a method that trains the feature extractor.

One use case for a feature extractor is a face search system. For example, if it is possible to quickly search for the face of a specific search target, such as a lost child or an important wanted criminal, from numerous faces captured in the video of a surveillance camera, the prevention of an accident or a crime can be expected. A face search system is disclosed in Japanese Unexamined Patent Application, First Publication No. 2020-52822.

In the system of Japanese Unexamined Patent Application, First Publication No. 2020-52822, the feature amount of the face of a person that is a search target is registered in advance in an authentication database. Then, face regions of people are extracted from the image to be searched that has been captured by the surveillance camera, and a feature amount is calculated for each of the extracted face regions. When any of the obtained features are sufficiently close to the features registered in a face authentication database, the search target is considered to have been found.

A subject search system such as that described previously first performs subject detection on an image to be searched, and because feature extraction and feature vector comparison are performed for each of the detected subjects, there is a problem that the detection time increases in a case in which many small subjects appear in the image to be searched. For example, the feature extractor disclosed in Deng, Jiankang, et al "Arcface: Additive angular margin loss for deep face recognition." Proceedings of the IEEE Conference on Computer Vision and Pattern Recognition. 2019 (hereafter referred to as "Deng et al.") is designed to extract feature vectors from a face image in which the facial position is normalized, and the vertical and horizontal dimensions are both 112 pixels based on the positions of five face organ points. In addition, the feature extractor disclosed in Deng et al. employs a deep neural network that has a large number of parameters, and although the accuracy in identifying the face of a person is high, the processing time is long. In other words, it can be said that the feature extractor is designed to identify faces with high accuracy from clear face images. Therefore, in a case in which there are many small faces appearing in the image to be searched, the processing time becomes long, and it becomes difficult to search for a specific face at a high speed.

One of objects of the present invention is to provide an image processing apparatus capable of searching for a predetermined subject at high speed in a case in which a large number of small subjects are present in an image to be searched and the like.

SUMMARY OF THE INVENTION

In one aspect of the present invention, in an image processing apparatus one or more processors, and one or more memories that store computer-readable instructions configured to be executed by the one or more processors, thereby the computer-readable instructions causing the information processing apparatus to acquire a query image including a subject that is a search target, and an image to be searched, extract a first feature vector that represents features of the search target included in the query image, extract a feature vector map that represents feature vectors of a subject at each position of the image to be searched, and perform an arithmetic operation based on the first feature vector and the feature vector map to obtain a heat map that represents the likelihood that the search target is present.

Further features of the present invention will become apparent from the following description of exemplary embodiments (with reference to the attached drawings).

DESCRIPTION OF THE EMBODIMENTS

Embodiments of the present invention are explained below with reference to the drawings. However, the present invention is not limited to the following embodiments. It should be noted that in each diagram, the same reference signs are applied to the same members or elements, and duplicate descriptions will be omitted or simplified.

Hereinafter, a case in which a specific face is searched for as a subject will be explained as an example. A face of a search target is referred to as a query face, an image in which a query face is known to appear is referred to as a query image, and an image in which a query face may appear is referred to as an image to be searched. An object of the present invention is to search for a query face from an image to be searched.

However, the target to be searched of the present invention is not limited to a face, and can be any target for which identity can be determined by a feature vector. That is, in the embodiments, an example in which a face is a query subject will be explained, but a query subject is not limited to a face. For example, a query subject can be a specific animal, or a specific object.

First Embodiment

Figure 1:
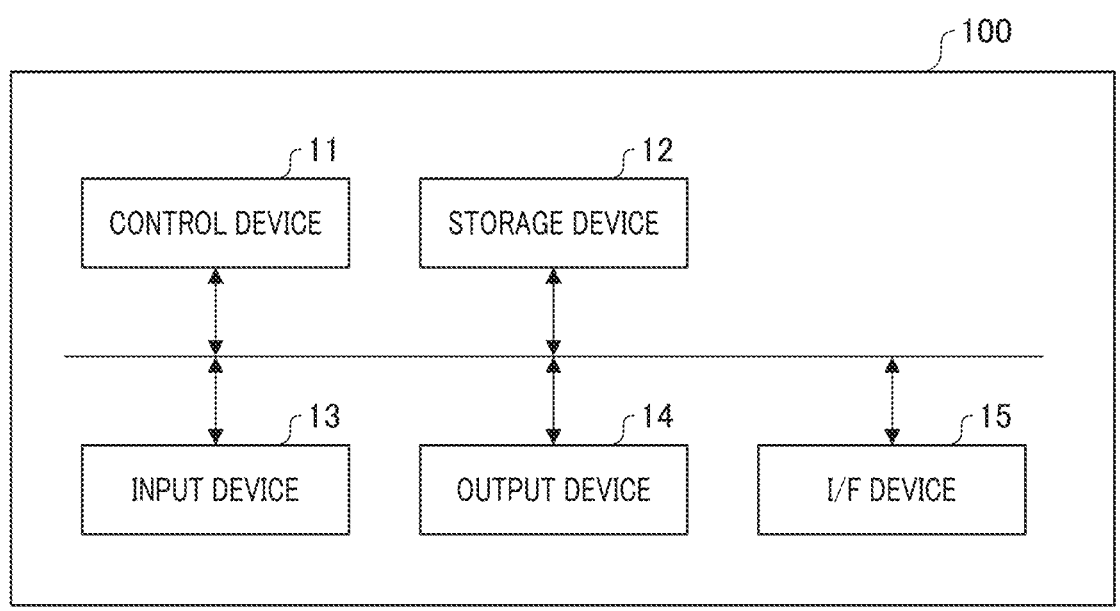
FIG. 1 is a diagram showing an example of a hardware configuration of an image processing apparatus.

FIG. 1 is a diagram showing an example of a hardware configuration of an image processing apparatus according to a first embodiment. The image processing apparatus 100 includes a control device 11, a storage device 12, an input device 13, an output device 14, an OF device 15, and the like serving as a hardware configuration.

The control device 11 incorporates a CPU serving as a computer and controls the entire image processing apparatus 100. The storage device 12 holds computer programs and data necessary for the operation of the control device 11. The input device 13 is a human interface device or the like, and inputs an operation of a user into the image processing apparatus 100.

The output device 14 generates an image signal, such as a display image signal, to be displayed on a display device and the like (not shown), and presents the processing results of the image processing apparatus 100 or the like to the user. The OF device 15 is a wired interface such as a universal serial bus, an Ethernet (registered trademark), or an optical cable, or a wireless interface such as Wi-Fi or Bluetooth (registered trademark).

The OF device 15 includes a function for connecting a camera to input a captured image into the image processing apparatus 100, a function for transmitting a processing result acquired by the image processing apparatus 100 externally, and a function for inputting a program and data and the like necessary for an operation of the image processing apparatus 100 into the image processing apparatus 100 and the like.

Figure 2:
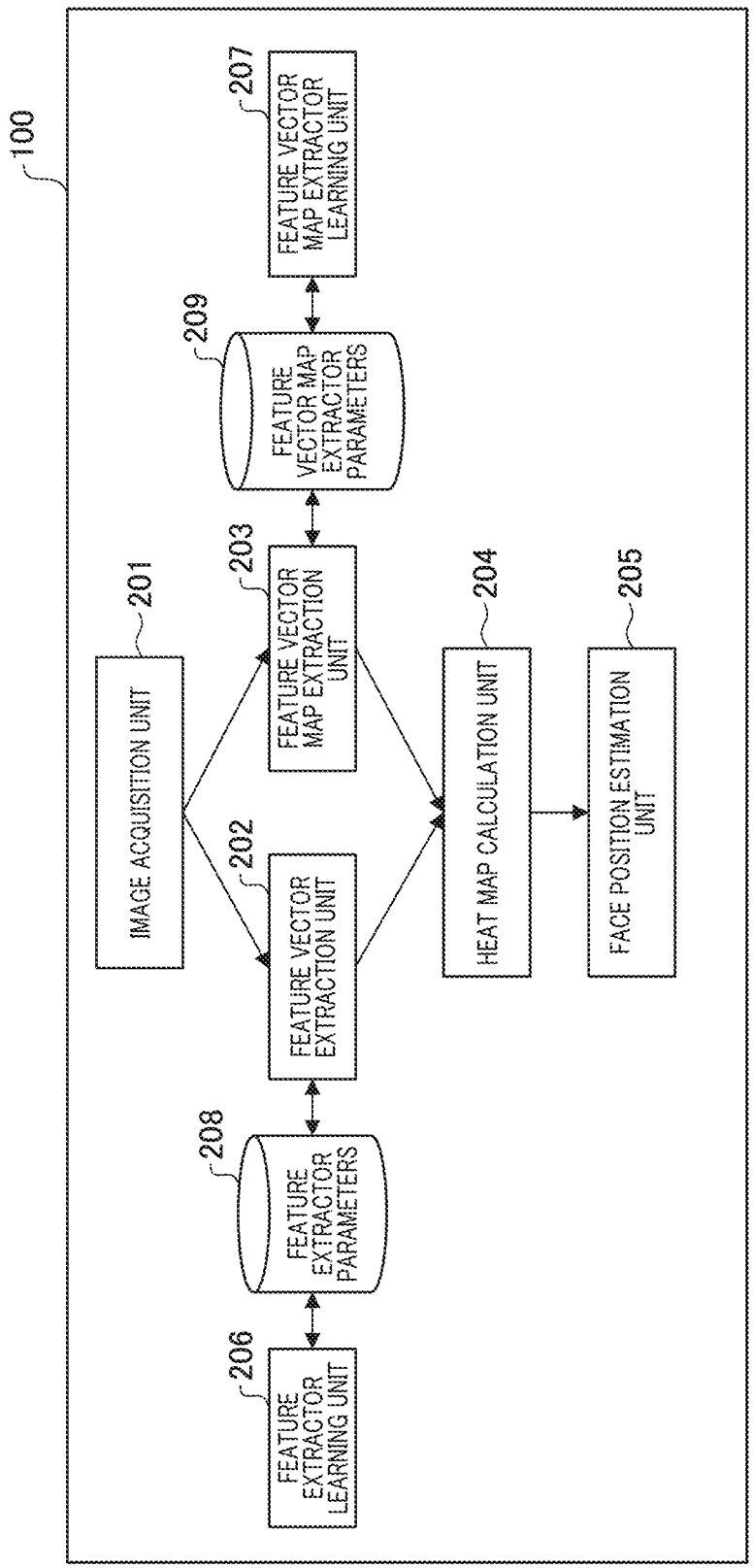
FIG. 2 is a functional block diagram showing an example of a functional configuration of the image processing apparatus.

FIG. 2 is a functional block diagram showing an example of a functional configuration of the image processing apparatus in the First Embodiment. It should be noted that a portion of the functional blocks shown in FIG. 2 are realized by causing the CPU serving as a computer included in a control device to execute a computer program stored in a memory serving as a storage medium.

However, some or all of the functional blocks may be implemented by hardware. Serving as the hardware, a dedicated circuit (ASIC), a processor (a reconfigurable processor, or a DSP), or the like can be used.

Each functional block illustrated in FIG. 2 may not be embedded in the same casing or may be configured with separate devices connected via a signal path. The foregoing description in FIG. 2 similarly applies to FIGS. 5, 7, 8, and 10.

Serving as a functional configuration, the image processing apparatus 100 includes an image acquisition unit 201, a feature vector extraction unit 202, a feature vector map extraction unit 203, a heat map calculation unit 204, and a face position estimation unit 205. In addition, the image processing apparatus 100 includes a feature extractor learning unit 206 and a feature vector map extractor learning unit 207.

The image acquisition unit 201 serving as an image acquisition means acquires a query image, which is an image that includes a subject that is the search target, and an image to be searched, which may include the search target. A query image and an image to be searched acquired by the image acquisition unit 201 may be an image captured by a security camera or the like, may be an image recorded on a recording device such as a hard disk, or may be an image received via a network such as the Internet.

The query image that has been acquired by the image acquisition unit 201 is transmitted to the feature vector extraction unit 202, and the image to be searched that has been acquired by the image acquisition unit 201 is transmitted to the feature vector map extraction unit 203.

The feature vector extraction unit 202 detects a query face from the query image acquired by the image acquisition unit 201, and extracts a feature vector of the query face. The feature vector that has been extracted by the feature vector extraction unit 202 is transmitted to the heat map calculation unit 204. Here, the feature vector extraction unit 202 functions as a feature vector extraction means that extracts a first feature vector representing a feature of the search target that is included in the query image.

The feature vector map extraction unit 203 extracts a feature vector map from the image to be searched that was acquired by the image acquisition unit 201. The feature vector map that has been extracted by the feature vector map extraction unit 203 is sent to the heat map calculation unit 204. Here, the feature vector map extraction unit 203 functions as a feature vector map extraction means that extracts a feature vector map representing feature vectors of a subject at each position of the image to be searched.

The heat map calculation unit 204 calculates a heat map from the feature vectors extracted by the feature vector extraction unit 202, and the feature vector map extracted by the feature vector map extraction unit 203.

Here, the heat map calculation unit 204 functions as a heat map calculation unit that performs an arithmetic operation between the first feature vector, and the feature vector map, and calculates a heat map that represents the likelihood of the presence of a search target. The heat map that has been estimated by the heat map calculation unit 204 is sent to the face position estimation unit 205.

The face position estimation unit 205 estimates a candidate position in which a query face may appear in the image to be searched based on the heat map that has been estimated by the heat map calculation unit 204. Here, the face position estimation unit 205 functions as a candidate position estimation unit that estimates from the heat map candidate positions, which are positions in which a search target is most likely to appear in the image to be searched.

The feature extractor learning unit 206 trains the feature extractor that is used by the feature vector extraction unit 202 to extract feature vectors from an image, and stores the parameters thereof as feature extractor parameters 208 in the storage device 12.

The feature vector map extractor learning unit 207 trains the feature vector map extractor that is used by the feature vector map extraction unit 203 to extract a feature vector map from the image. Then, the parameters thereof are stored as feature vector map extractor parameters 209 in the storage device 12.

The image processing apparatus 100 according to the present embodiment trains a feature extractor and a feature vector map extractor during a training phase, and performs a search for a specific subject by using the trained feature extractor and the feature vector map extractor during a search phase. In the following, the flow of the training process and the flow of the search process will be explained in sequence.

Figure 3:
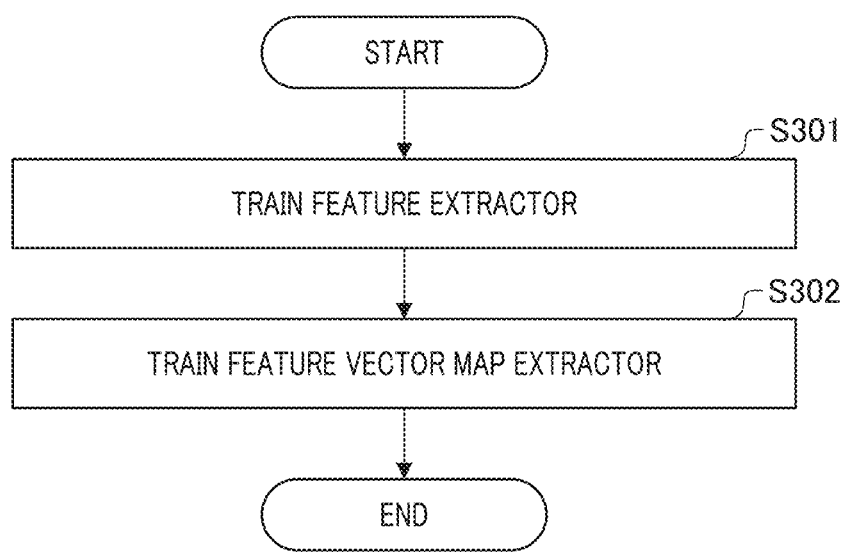
FIG. 3 is a flowchart showing a flow of the training process by the image processing apparatus.

An example of the flow of the training process of the image processing apparatus 100 according to the present embodiment will be explained with reference to FIG. 3. FIG. 3 is a flowchart showing a flow of the training process by the image processing apparatus according to the First Embodiment. It should be noted that the operation of each step of the flowchart of FIG. 3 is performed by a CPU that serves as a computer in a control device performing control by executing a computer program stored in a memory.

In step S301, the feature extractor learning unit 206 trains a feature extractor used by the feature vector extraction unit 202 to extract feature vectors from an image, and stores the parameters thereof as feature extractor parameters 208 in the storage device 12. The feature extractor is trained by a known method such as one called distance learning, and the like.

A method of creating training data for use in training a feature extractor will be explained. First, a large number of face images with known person IDs are collected. The number of different person IDs in the training data is C, and the person IDs are assumed to be assigned sequentially from 1 to C.

Next, a normalized face image is acquired by applying a normalization process to a face image. The normalized face image is an image extracted so that both the height and width are a predetermined number of pixels, with no tilting of the face to the left or to the right, the size of the face is approximately constant, and the relative position of the face to the normalized face image is approximately constant. The purpose of the normalization process is to reduce variations in the in-plane rotational angle and size of a face captured in a face image.

Figure 4:
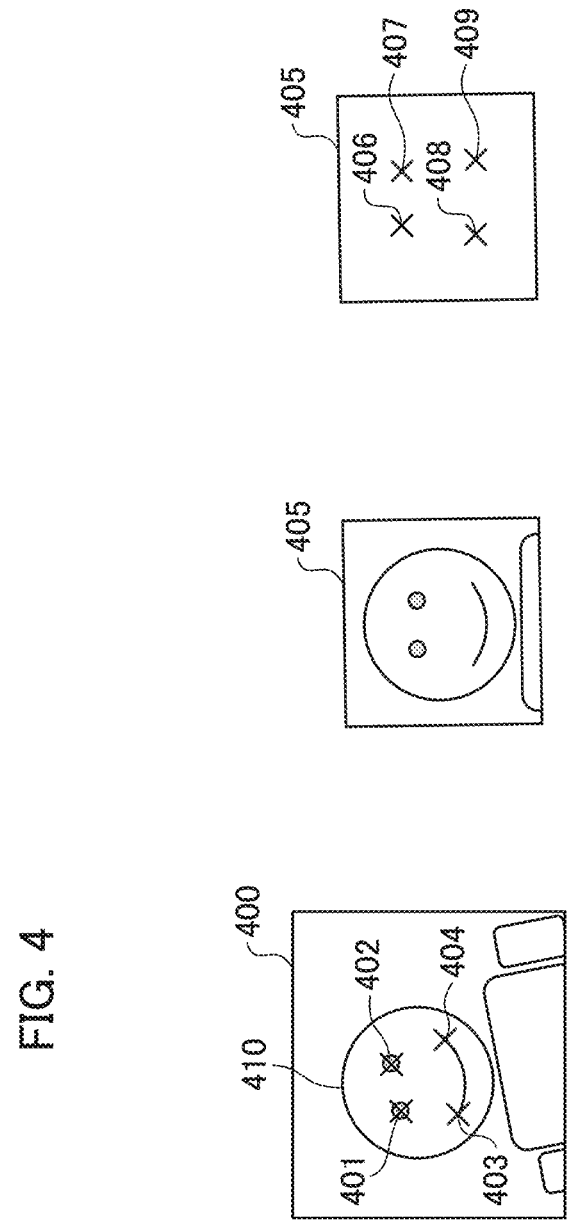
FIG. 4 is a diagram showing an example of normalization of a face image.

FIG. 4 is a diagram showing an example of normalization of a face image. A face image 400 is an image that includes one of a face 410 with an ID (identifier) that is known as identifying information. A known organ point position estimation technique is used to estimate the positions of organ points such as the eyes, nose, and mouth of the face 410 in the face image 400.

In a case in which position estimation of an organ point fails, the corresponding face image will not be included in the training data. In FIG. 4, as an example, the positions of a right eye center 401, a left eye center 402, a right mouth end 403, and a left mouth end 404 are estimated.

Next, a normalized face image 405 is extracted from the face image 400 based on the positions of the organ points. This extraction is performed, for example, by applying a geometric transformation, such as an affine transformation, to the face image 400 such that that the right eye center 401 approaches the predetermined position 406, the left eye center 402 approaches the predetermined position 407, the right mouth end 403 approaches the predetermined position 408, and the left mouth end 404 approaches the predetermined position 409 of the normalized face image 405. By the above-described method, training data can be created.

Next, the feature extractor is trained by using the created training data. The feature extractor is a deep neural network that takes a normalized face image as input, and outputs a feature vector of fixed dimensions. Hereinafter, the dimensionality of the feature vector is denoted as D. For example, D can take a value of 128, 256, 512, and the like.

The feature extractor can be configured by connecting a fully connected layer to a network that is derived from a Convolutional Neural Network (CNN), such as, for example, a Residual Neural Network (ResNet) or a Visual Geometry Group (VGG). In this case, the output of the fully connected layer is designed so as to be D.

During the training of the feature extractor, a class classification layer that takes the feature vector as input and outputs a C-dimensional probability vector is connected behind the feature extractor. An i-th component of the probability vector (where i is an integer from 1 to C) expresses the probability that the person ID of the face seen in the face image is i. The feature extractor and the class classification layer are trained by using a technique such as backpropagation so that the probability vector, which is the output of the class classification layer, approaches the One-Hot vector.

Here, the One-Hot vector refers to a vector in which, assuming that the ID of the correct person in the face image is denoted as j, only the j-th component is 1, and other components are 0. During the training of the feature extractor, a constraint is set so that the length (for example, the L2 norm) of the feature vector output by the feature extractor approaches a predetermined value.

The feature extractor is trained in advance according to the framework of distance learning. That is, the feature extractor is trained so as to output feature vectors at a short distance from each other for images of an identical subject or subjects belonging to an identical class. In addition, the feature extractor is trained in advance so as to output feature vectors at a long distance from each other for images of non-identical subjects or subjects that do not belong to an identical class.

For example, as in Deng et al, the feature extractor may be trained by a method that defines the angle between the feature vectors output by the feature extractor as a distance. That is, for images that include an identical subject or subjects belonging to an identical class, the feature extractor is trained so that the angle between the feature vectors output by the feature extractor becomes smaller than a predetermined angle. In addition, for images of non-identical objects or objects belonging to non-identical classes, the feature extractor is trained so that the angle between the feature vectors output by the feature extractor becomes larger.

A case is assumed in which an image that includes an identical subject or subjects belonging to an identical class is input to the feature vector extraction unit 202 and the feature vector map extraction unit 203. In that case, the feature vector output by the feature vector extraction unit 202 may be trained in advance so that the difference in distance between the feature vector output by the feature vector extraction unit 202 and the feature vector at the position of the subject in the feature vector map becomes less than or equal to a predetermined value.

After training, by discarding the class classification layer, a feature extractor that extracts feature vectors from an image can be obtained. The feature extractor learning unit 206 stores the parameters of this feature extractor in the storage device 12 as feature extractor parameters 208.

In step S302, the feature vector map extractor training unit 207 trains the feature vector map extractor used when the feature vector map extraction unit 203 extracts a feature vector map from the image. Then, the parameters thereof are stored as feature vector map extractor parameters 209 in the storage device 12.

The feature vector map extractor is a deep neural network that takes an image having H for height and W for width as input, and outputs a feature vector map having a height of $H/K_h$, a width of $W/K_w$, and a depth of D.

Here, $K_h$ and $K_w$ are constants that determine the ratio between the size of the input image and the size of the feature vector map. The values of $K_h$ and $K_w$ may be set arbitrarily. As $K_h$ and $K_w$ are made larger, the size of the feature vector map becomes smaller, thereby reducing the computational complexity of the feature vector map extractor. $K_h$ and $K_w$ may be the same value.

The feature vector at the position $(x/K_w, y/K_h)$ of the feature vector map represents the facial feature amount of a face in the vicinity of position (x, y) of the input image. This feature vector is designed such that the similarity between the feature vector and the feature vector that can be obtained when a face image with a face in the vicinity of the position (x, y) of the input image is input to the feature extractor trained in step S301 becomes high. Hereinafter, an example of a training method for a feature vector map extractor will be explained.

First, a method of creating training data for use in training of a feature vector map extractor will be explained. The training data is configured from pairs of an image in which a face appears and the corresponding ground truth feature vector map for that image.

Figure 5:
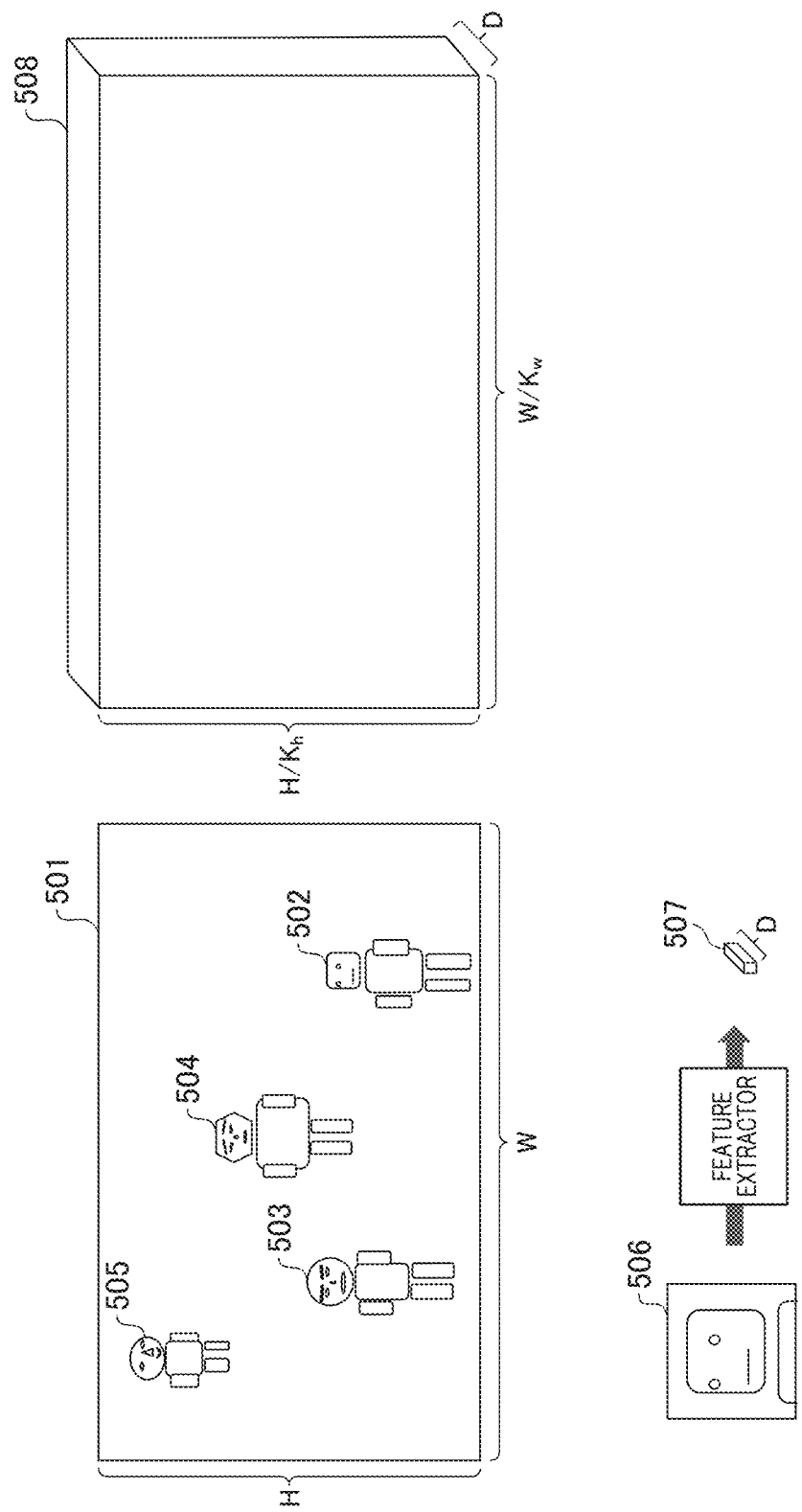
FIG. 5 is a diagram showing an example of the creation of a ground truth feature vector map.

Hereinafter, an example of the creation of a ground truth feature vector map will be explained by using FIG. 5. FIG. 5 is a diagram showing an example of the creation of a ground truth feature vector map. First, an image 501 in which one or more faces appear is prepared. The height of the image 501 is H and width is W. Next, a vector map having a height of $H/K_h$, a width of $W/K_w$, and a depth of D is generated, and all values are initialized to zero.

Next, the positions of faces 502 to 505 are estimated from the image 501. The position of a face can be acquired from annotation information separately provided to the image 501, or by applying a known face detection technique to the image 501.

Next, a normalized face image is generated for each of the faces 502 to 505 that are present in the image 501 by the same method that was explained in step S301, and a feature vector is estimated by applying the feature extractor that was trained in step S301. A normalized face image 506 is an example of a normalized face image corresponding to a face 502. A feature vector 507 is an example of a feature vector corresponding to the face 502.

Next, a feature vector corresponding to a face at a position (x, y) in the image 501 is added to a position $(x/K_w, y/K_h)$ of the vector map. At this time, the feature vector may also be added to a position within a certain range from the position $(x/K_w, y/K_h)$ of the vector map.

Furthermore, the feature vector may be added to the vector map after applying a process to shorten the length of the feature vector as the distance from the position $(x/K_w, y/K_h)$ of the vector map increases.

For example, the center position of the face 502 in the image 501 is represented by (x1, y1), and the feature vector 507 corresponding to the face 502 is represented by v. The vector superimposed at the position $(x1/K_w+\Delta x, y1/K_h+\Delta y)$ of the ground truth feature vector map becomes $v \cdot f(\Delta x, \Delta y) \cdot g(\Delta x, \Delta y)$.

That is, the feature vector obtained when an image that includes the subject at the position (x, y) of the image is input to the feature vector extraction unit 202 is multiplied by a coefficient calculated based on $\Delta x$ and $\Delta y$. Thereby, the feature vector at the position $(x/K_w+\Delta x, y/K_h+\Delta y)$ of the ground truth feature vector map may be calculated.

Here, a function f (x, y) is a function that takes smaller values as x and y become larger (for example, a two-dimensional normal distribution such that the mean vector is $(0, 0)^T$). In addition, a function g(x, y) is a function that takes the value 1 when $\Delta x \cdot \Delta x + \Delta y \cdot \Delta y$ is less than or equal to the square of R, and takes the value 0 otherwise. Here, R is a predetermined value representing a real number other than 0.

By multiplying the function g(x, y), the feature vector map extractor is trained so as to output a zero vector corresponding to a non-face region in the image 501. The vector map that has undergone the above-described processing becomes the ground truth vector map 508 corresponding to the image 501.

The image 501 may be artificially created. For example, the image 501 can be artificially created by preparing a background image and superimposing a human face image at an appropriate position on the background image. If information as to which position of the background image the face image was superimposed is made metadata, a ground truth feature vector map corresponding to the image 501 can be generated without estimation of the face position. By the above-described method, training data can be created.

Next, the feature vector map extractor is trained by using the created training data. The feature vector map extractor is designed by a deep neural network called a Fully Convolutional Network, represented, for example, by U-Net and the like.

The feature vector map extractor is trained by using error back-propagation or the like so that the output obtained when the image of the training data is given to the feature vector map extractor approaches the ground truth feature vector map of the training data. The feature vector map extractor learning unit 207 stores the parameters of this feature vector map extractor in the storage device 12 as feature vector map extractor parameters 209.

The above-described explanation assumes the use of a network derived from a CNN (Convolutional Neural Network) that serves as a feature vector map extractor, but a network derived from a ViT (Vision Transformer) can also be used. For example, by using the SimVIT block disclosed in the paper "Simvit: Exploring a simple vision transformer with sliding windows" by Li, Gang, et al., presented at the 2022 IEEE International Conference on Multimedia and Expo (ICME), it is possible to design a feature vector map extractor that outputs a feature map having a height of $H/K_h$, width of $W/K_w$, and depth of D.

Figure 6:
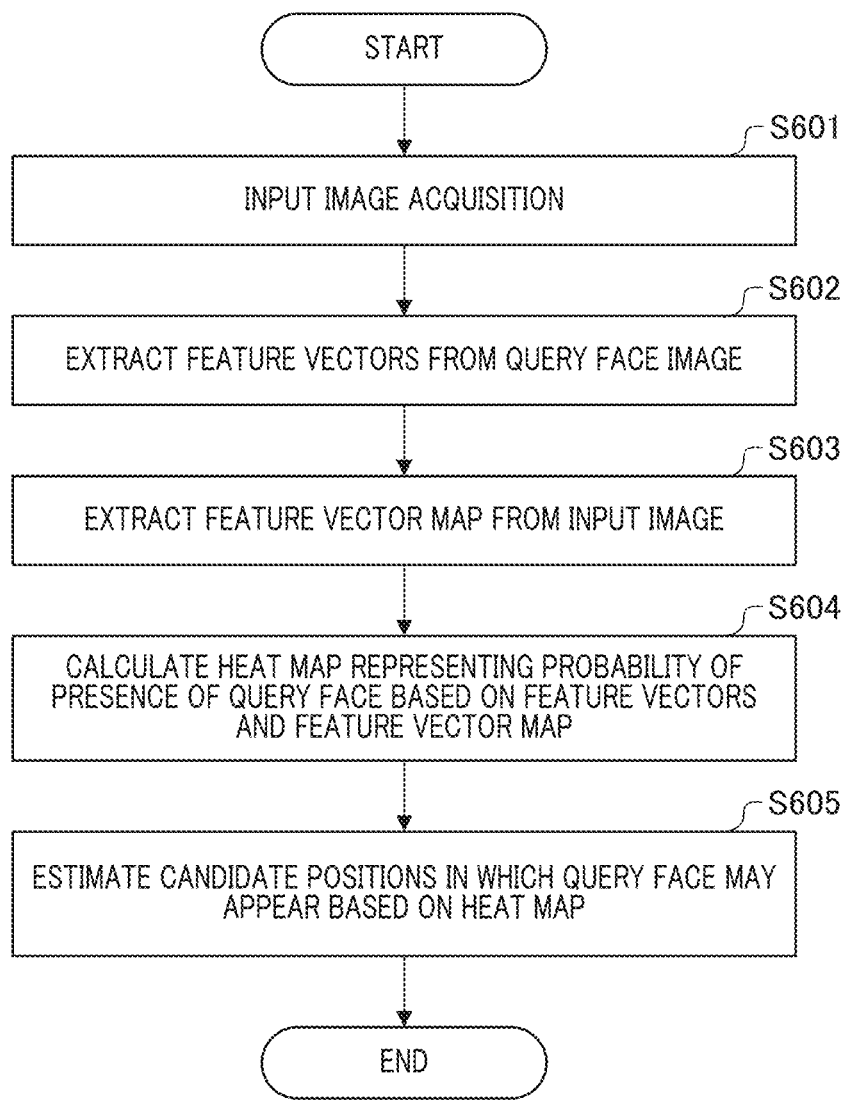
FIG. 6 is a flowchart showing the flow of the search process by the image processing apparatus.
Figure 7:
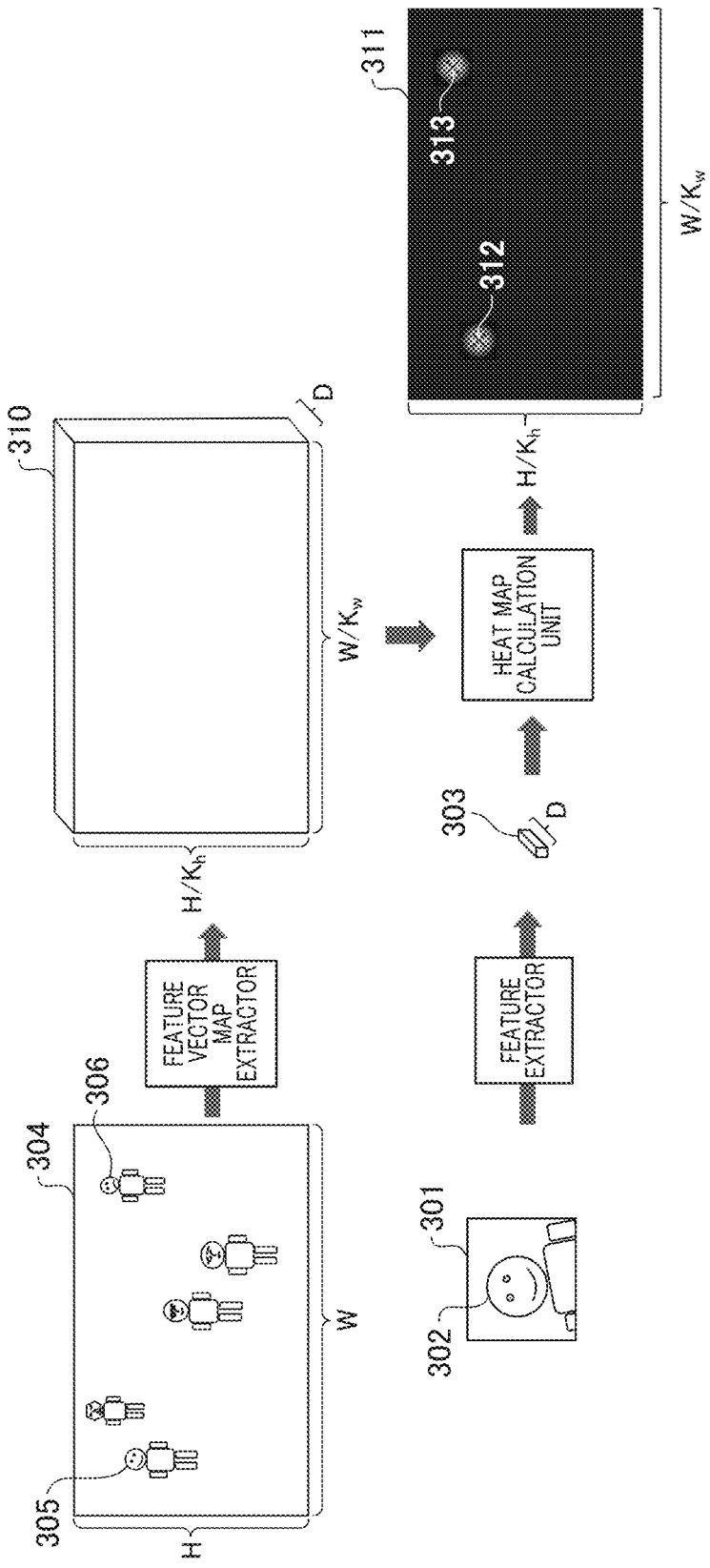
FIG. 7 is a diagram showing an overall system for searching for a specific face.

Next, an example of the flow of the search process of the image processing apparatus 100 according to the present embodiment will be explained with reference to FIG. 6 and FIG. 7. FIG. 6 is a flowchart showing the flow of the search process by the image processing apparatus in the present embodiment. FIG. 7 is a diagram showing an overall system for searching for a specific face. It should be noted that the operation of each step of the flowchart of FIG. 6 is performed by a CPU that serves as a computer in a control device performing control by executing a computer program stored in a memory.

In step S601 (image acquisition step), the image acquisition unit 201 acquires a query image 301, which is an image that includes a subject to be searched, and an image to be searched 304, which may include the search target. In the query image 301, only one query face appears, and no other faces except for the query face are captured. The height of the image to be searched 304 is H and the width of the image to be searched 304 is W.

In step S602, the feature vector extraction unit 202 detects a query face 302 from the query image 301 that has been acquired by the image acquisition unit 201, and extracts a feature vector 303 of the query face 302. Here, step S602 functions as a feature vector extraction step for extracting a first feature vector that represents features of a search target included in the query image.

Details of feature vector extraction will be explained. First, the feature vector extraction unit 202 generates a normalized query image by the same method that was explained in step S301. Then, the feature vector extraction unit 202 extracts the feature vector 303 of the query face 302 from the normalized query image by using the feature extractor parameters 208 that have been learned in advance in step S301. The feature vector 303 is a vector of a dimensionality D.

In step S603, the feature vector map extraction unit 203 extracts a feature vector map 310 from the image to be searched 304 that was acquired by the image acquisition unit 201. The image to be searched 304 is an image in which the same person as the query face 302 may appear. Here, it is assumed that a face 305 is the face of the same person as the query face 302. Here, step S603 functions as a feature vector map extraction step for extracting a feature vector map that represents feature vectors of a subject at each position of the image to be searched.

The feature vector map extraction unit 203 extracts a feature vector map 310 from the image to be searched 304 by using the feature vector map extractor parameters 209 that have been learned in advance in step S302. The feature vector map 310 is a map having a height of $H/K_h$, a width of $W/K_w$, and a depth of D. The feature vector at the position $(x/K_w, y/K_h)$ in this map represents the facial feature amount of a face in the vicinity of the position (x, y) of the image to be searched 304.

In step S604, the heat map calculation unit 204 calculates a heat map 311 based on the feature vector 303 that was extracted by the feature vector extraction unit 202 and the feature vector map 310 that was extracted by the feature vector map extraction unit 203. Here, step S604 functions as a heat map calculation step for performing an arithmetic operation between the first feature vector and the feature vector map, and calculating a heat map that represents the likelihood that a search target is present.

The heat map 311 is a map with a height of $H/K_h$, a width of $W/K_w$, and a depth of 1. The value of the position (x, y) of the heat map 311 is determined by the similarity (for example, inner product) between the feature vector at the position (x, y) of the feature vector map 310 and the feature vector 303. The calculation of the 311 heat map described above is equivalent to a 1×1 convolution operation. Therefore, it is possible to consider the feature vector 303 as the weight of the 1×1 convolution, and configure modules or circuits for a convolution operation so as to calculate the heat map 311.

The heat map 311 can be interpreted as a map representing the likelihood that the query face 302 is present. That is, in a case in which the center of the query face 302 is at position (x1, y1) in the image to be searched 304, the value of position $(x1/K_w, y1/K_h)$ of the heat map 311 is expected to be a maximum value.

In addition, the value of the heat map 311 is expected to become smaller the farther away from the position $(x1/K_w, y1/K_h)$. Furthermore, in a case in which there is no face in the vicinity of the position (x2, y2) of the image to be searched 304, or in a case in which there is a face of a person different from the query face 302, the value of the position $(x2/K_w, y2/K_h)$ of the heat map 311 is expected to be a value close to zero.

In step S605, the face position estimation unit 205 estimates candidate positions in the image to be searched 304 in which the query face 302 may appear based on the heat map 311 that has been estimated by the heat map calculation unit 204.

The estimation of a candidate position can be performed by selecting a position in the heat map 311 such that the value thereof is a maximum and is equal to or greater than a threshold value. That is, the candidate position in the image to be searched is determined based on the position where in the heatmap calculated by the heat map calculation unit 204, the value thereof is a maximum and is equal to or greater than a threshold value.

In a case in which candidate positions are locally clustered, the number of candidate positions may be reduced by performing processing for merging candidate positions that are within a predetermined distance from each other. The candidate position (x3, y3) obtained on the heat map 311 correspond to the candidate position $(x3/K_w, y3/K_h)$ in the image to be searched 304.

A position 312 and a position 313 in FIG. 7 are examples of candidate positions in the heat map 311. The candidate position 312 in the heat map 311 corresponds to the face 305 and the candidate position 313 in the image to be searched 304 corresponds the face 306 in the image to be searched 304, indicating the possibility that the face 305 and the face 306 are the same person as the query face 302.

In a case in which the number of candidate positions that have been estimated by the face position estimation unit 205 is 0, it is determined that the query face 302 has not been captured in the image to be searched 304. In addition, in a case in which the number of candidate positions that have been estimated by the face position estimation unit 205 is one or more, it is determined that the query face 302 was captured in the image to be searched 304. The face position estimation unit 205 may display an image to be searched on a display device via the output device 14 by generating a search image with a superimposed display, such as a circle or a rectangle, around estimated candidate positions.

As explained above, according to the image processing apparatus 100 of the First Embodiment, in a case in which a large number of small subjects appear in an image to be searched, it is possible to quickly estimate whether a certain subject appears, and the location of candidate positions in which a specific subject is likely to appear.

Second Embodiment

In a second embodiment, a case in which high-accuracy face recognition is performed in addition to the face search that was described in the First Embodiment will be explained. A description of similarities to the First Embodiment will be omitted, and only differences from the First Embodiment will be explained.

Figure 8:
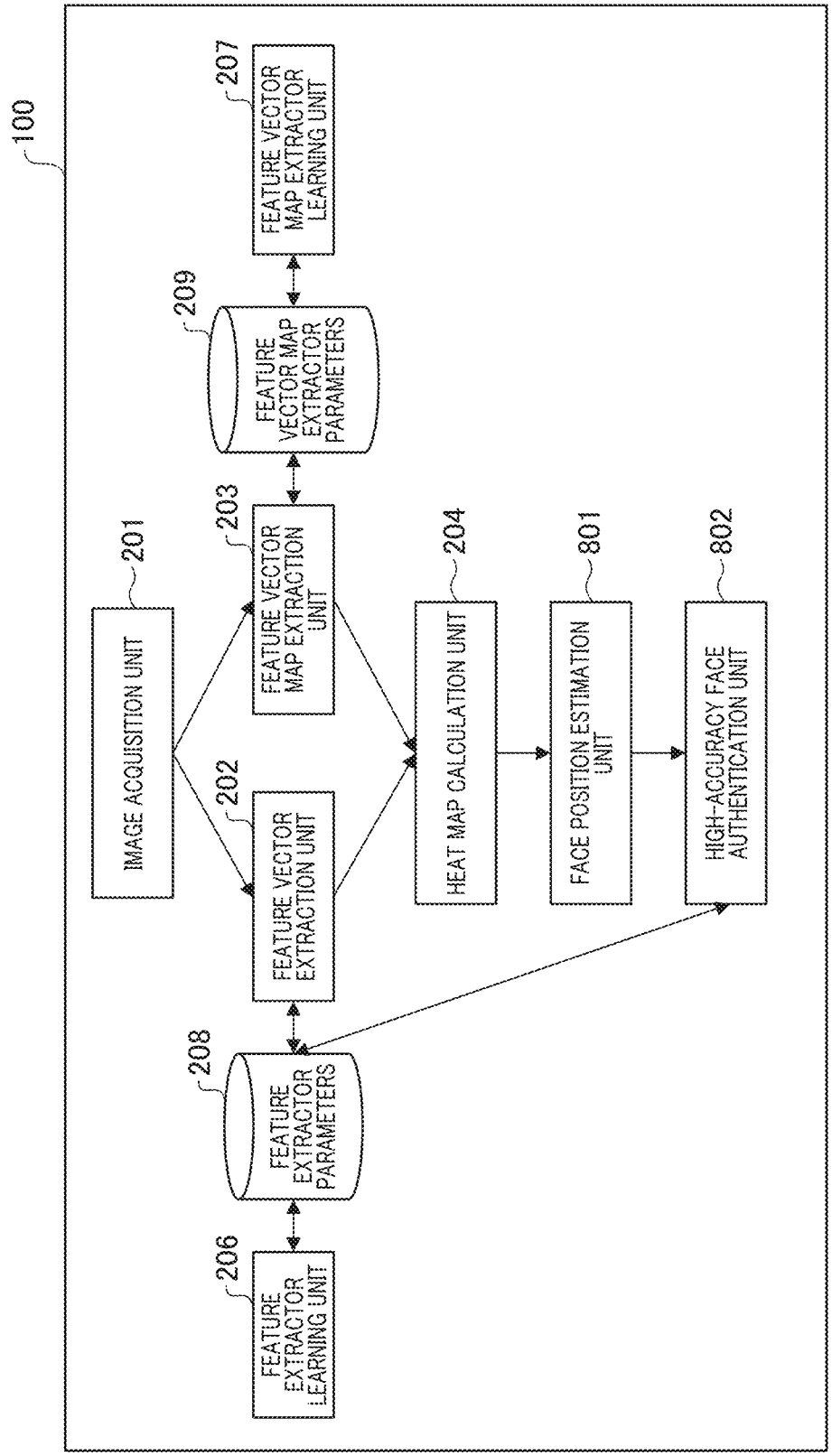
FIG. 8 is a functional block diagram showing an example of a functional configuration of the image processing apparatus.

FIG. 8 is a functional block diagram showing an example of the functional configuration of an image processing apparatus according to the Second Embodiment. The image processing apparatus 100 includes a face position estimation unit 801 and a high-accuracy face authentication unit 802. The face position estimation unit 801 estimates candidate positions in the image to be searched in which a query face is likely to appear, based on the heat map that has been calculated by the heat map calculation unit 204. The candidate positions estimated by the face position estimation unit 801 are sent to the high-accuracy face authentication unit 802.

For each face in the candidate positions estimated by the face position estimation unit 801, the high-accuracy face authentication unit 802 functions as a determination unit that uses high-accuracy face authentication to determine with high accuracy whether the query face appears.

Figure 9:
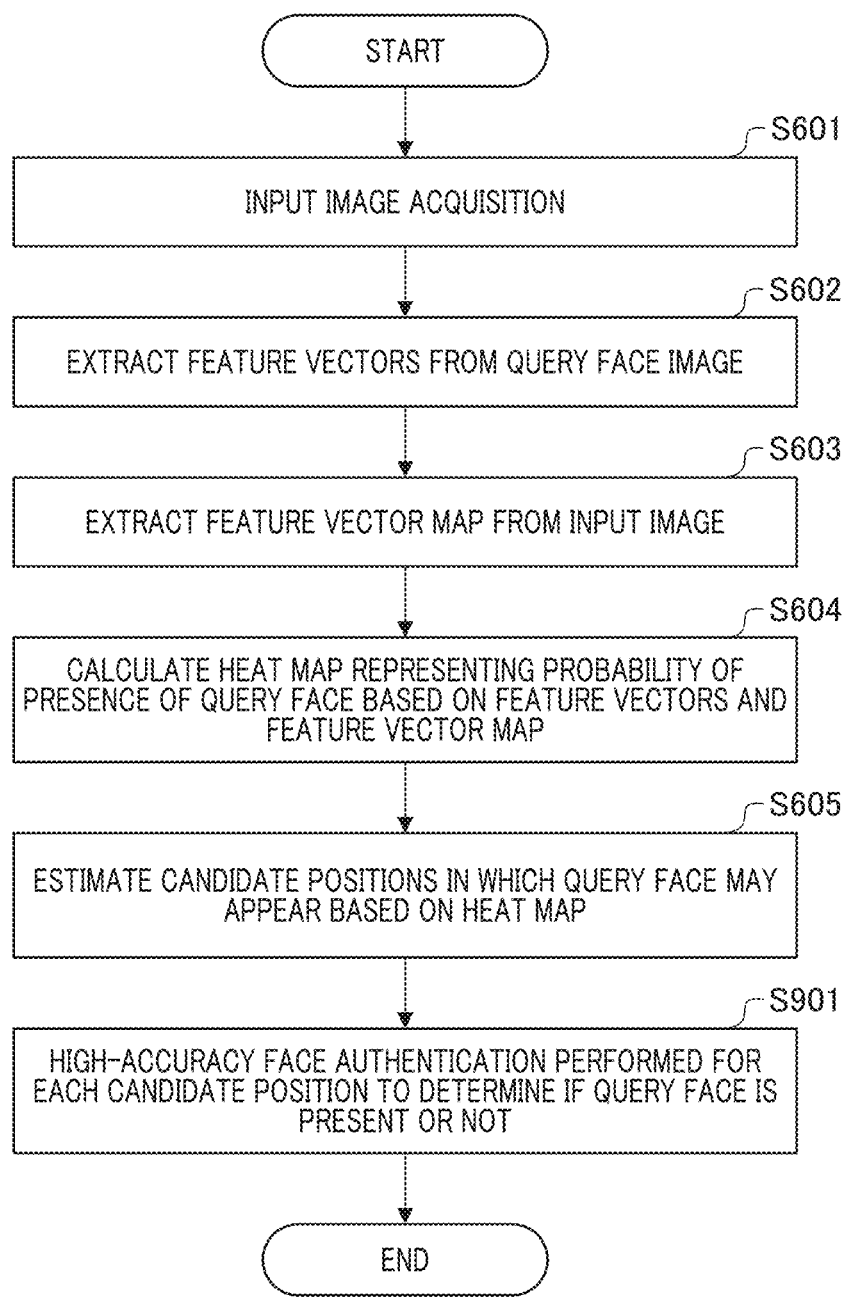
FIG. 9 is a flowchart showing the flow of the search process by the image processing apparatus.

An example of the processing flow of the image processing apparatus 100 according to the present embodiment will be explained with reference to FIG. 9. FIG. 9 is a flowchart showing the flow of a search process by the image processing apparatus according to the Second Embodiment. It should be noted that the operation of each step of the flowchart of FIG. 9 is performed by a CPU that serves as a computer in a control device performing control by executing a computer program stored in a memory. Because step S601 to step S605 in FIG. 9 are the same process as that of step S601 to step S605 in FIG. 6, an explanation thereof will be omitted.

In step S901, the high-accuracy face authentication unit 802 determines with high accuracy whether the query face appears by using high-accuracy face authentication for each face in a candidate position estimated by the face position estimation unit 801. Hereinafter, a case in which highly accurate face authentication is performed with respect to a face in the candidate position 312 in the heat map 311 of FIG. 7 will be explained.

A face image that is subject to highly accurate face authentication is acquired from the image to be searched 304. When the position of the candidate position 312 in the heat map 311 is denoted as (x4, y4), the candidate position of the image to be searched 304 corresponding thereto is $(x4/K_w, y4/K_h)$. A face is detected by applying a known face detection means to the vicinity (surroundings) of the position $(x4/K_w, y4/K_h)$ of the image to be searched 304.

Here, it is possible to detect faces of different sizes by performing face detection processing on each of a group of images in which an image to be searched 304 is resized to a slightly different size, and integrating the face detection results. After detecting a face, the generation of a normalized face image and the extraction of a feature vector using the feature extractor parameters 208 are performed in the same manner as that explained in step S602.

This feature vector can be expected to be the feature vector of the face 305. The similarity between the extracted feature vector and the feature vector 303 of the query face 302 is calculated, and whether or not the face 305 is the same person as the query face 302 is determined with high accuracy according to whether or not the similarity is greater than a preset threshold value.

That is, in the Second Embodiment, at each candidate position in the image to be searched, a subject image is acquired from the image to be searched, and a second feature vector is extracted by applying the feature vector extraction means to the subject image. Then, an arithmetic operation is performed between the first feature vector and the second feature vector, and it is determined whether or not the search target is present at a candidate position in the image to be searched.

In contrast to a conventional face search system, in which face detection is first performed on an image to be searched and highly accurate face recognition processing is performed on each detected face, the face search system of the present embodiment performs highly accurate face recognition on only a small number of candidates narrowed down by the heat map. Therefore, the face search time can be significantly reduced in a case in which a large number of small subjects appear in the image to be searched.

It is also possible to change the emphasis on either accuracy or speed of face search by a setting. In the case of accuracy emphasis, the number of candidate positions can be increased by decreasing the threshold value for selecting candidate positions in step S605, or by increasing the number of parameters of the feature vector map extractor or feature extractor, but the processing time increases.

In the case of speed emphasis, the number of candidate positions can be decreased by increasing the threshold value for selecting candidate positions in step S605, or by decreasing the number of parameters of the feature vector map extractor or feature extractor, but the accuracy decreases. It may be possible to enable a user to select speed emphasis or accuracy emphasis by using a UI having, for example, a slide bar and the like.

As explained above, according to the image processing apparatus 100 of the Second Embodiment, in a case in which a large number of small subjects appear in an image to be searched, it is possible to quickly limit candidate positions in which a predetermined subject (query subject) may appear in a heat map. Then, it is possible to search for a specific subject at high speed and with high accuracy by performing highly accurate subject determination only for candidate positions.

Third Embodiment

Similar to the Second Embodiment, in a Third Embodiment, in addition to the face search that was described in the First Embodiment, a case in which high-accuracy face recognition is performed will be explained. A description of similarities to the First Embodiment and Second Embodiment will be omitted, and only differences from the First Embodiment and Second Embodiment will be explained.

Figure 10:
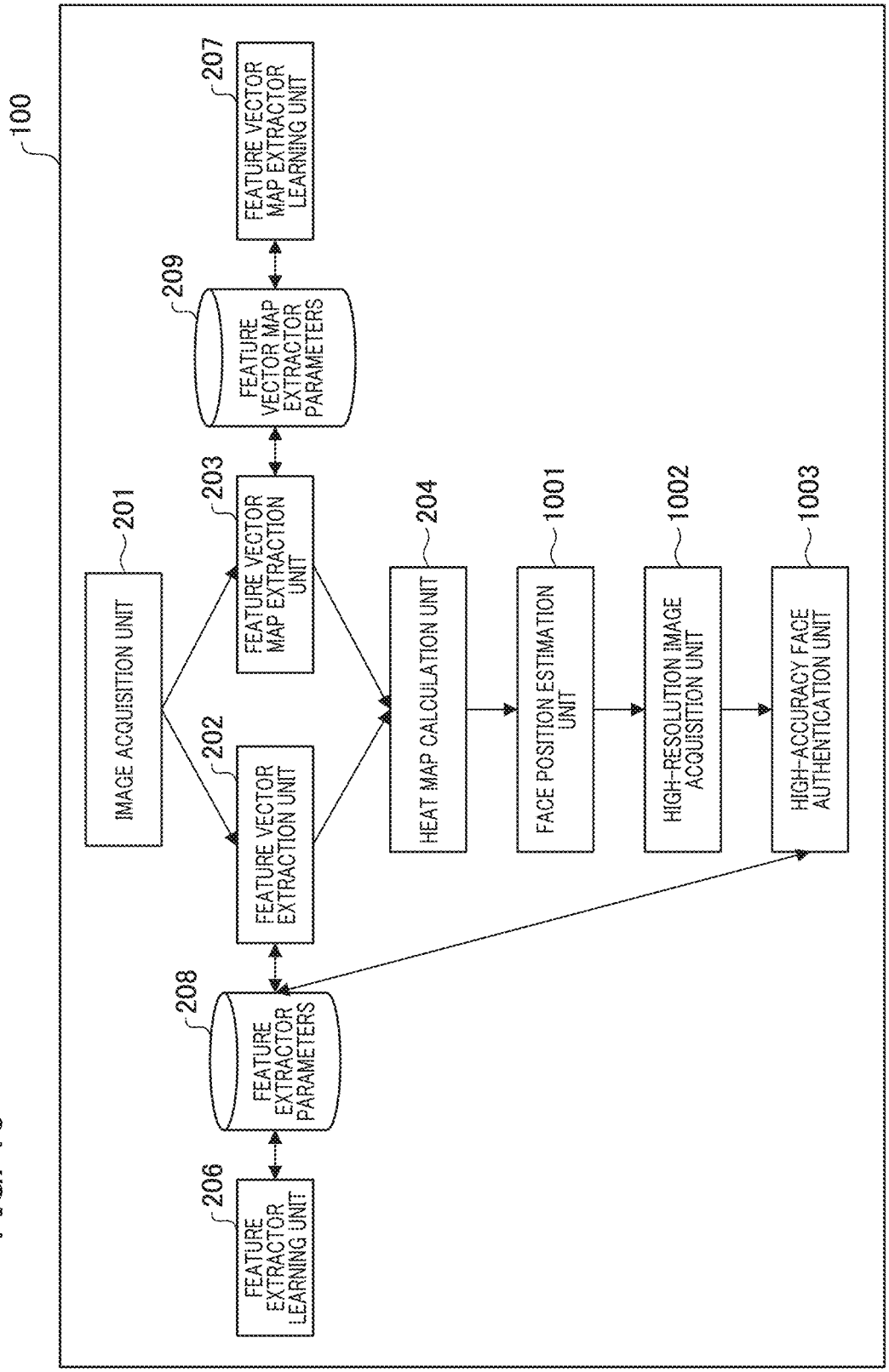
FIG. 10 is a functional block diagram showing an example of a functional configuration of the image processing apparatus.

FIG. 10 is a functional block diagram showing an example of a functional configuration of the image processing apparatus according to the Third Embodiment. The image processing apparatus 100 includes a face position estimation unit 1001, a high-resolution image acquisition unit 1002, and a high-accuracy face authentication unit 1003.

The face position estimation unit 1001 estimates candidate positions in the image to be searched in which a query face is likely to appear, based on the heat map that has been calculated by the heat map calculation unit 204. The candidate positions estimated by the face position estimation unit 1001 are sent to the high-resolution image acquisition unit 1002.

The high-resolution image acquisition unit 1002 acquires a high-resolution image of a face corresponding to a candidate position on the heat map estimated by the face position estimation unit 1001 by controlling a camera such as a PTZ (pan, tilt, zoom) camera.

Here, at each candidate position in the image to be searched, the high-resolution image acquisition unit 1002 functions as a high-resolution image acquisition unit for acquiring a higher-resolution subject image. The high-resolution image acquired by the high-resolution image acquisition unit 1002 is sent to the high-accuracy face authentication unit 1003.

The high-accuracy face authentication unit 1003 functions as a determination unit that uses high-accuracy face authentication to determine with high accuracy whether a query face appears in the high-resolution image that has been acquired by the high-resolution image acquisition unit 1002.

Figure 11:
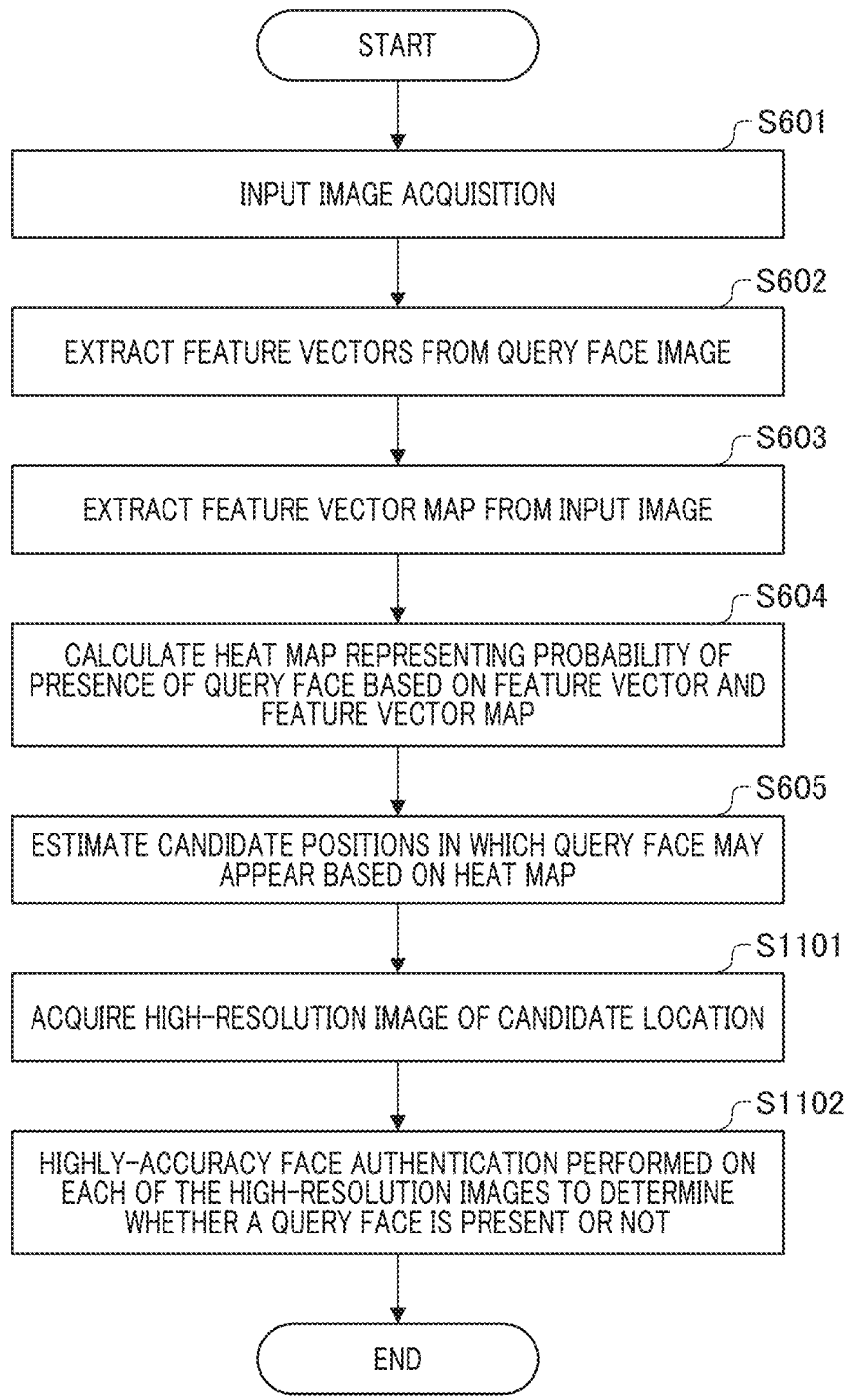
FIG. 11 is a flowchart showing the flow of the search process by the image processing apparatus.

An example of the processing flow of the image processing apparatus 100 according to the present embodiment will be explained with reference to FIG. 11. FIG. 11 is a flowchart showing a flow of a search process by the image processing apparatus according to the Third Embodiment. It should be noted that the operation of each step of the flowchart of FIG. 11 is performed by a CPU that serves as a computer in a control device performing control by executing a computer program stored in a memory. Because step S601 to step S605 in FIG. 11 are the same process as that of step S601 to step S605 in FIG. 6, an explanation thereof will be omitted.

In step S1101, the high-resolution image acquisition unit 1002 acquires a high-resolution image of a face corresponding to a candidate position on the heat map estimated by the face position estimation unit 1001 by controlling a camera such as a PTZ camera. Hereinafter, a case in which highly accurate face authentication is performed with respect to a face in the candidate position 312 in the heat map 311 of FIG. 7 will be explained.

A face image that is subject to highly accurate face authentication is acquired by controlling a camera such as a PTZ camera. The PTZ camera is calibrated in advance so as to be able to acquire a zoomed-in image of an arbitrary position in the image to be searched.

When the position of the candidate position 312 in the heat map 311 is denoted as (x4, y4), the position of the image to be searched 304 corresponding thereto is $(x4/K_w, y4/K_h)$. A high-resolution image corresponding to the position $(x4/K_w, y4/K_h)$ of the image to be searched 304 is acquired by driving the PTZ camera to, for example, point the PTZ camera at the position $(x4/K_w, y4/K_h)$ and zoom in. Therefore, in this high-resolution image, the face 305 will appear more clearly than before driving the PTZ camera.

The high-accuracy face authentication unit 1003 uses high-accuracy face authentication to determine with high accuracy whether a query face appears in the high-resolution image acquired by the high-resolution image acquisition unit 1002. Hereinafter, an example thereof will be explained.

The high-accuracy face authentication unit 1003 receives the high-resolution image acquired by the high-resolution image acquisition unit 1002 in step S1101. Next, after detecting a face by applying a known face detection technique to the high-resolution image, the generation of a normalized face image and the extraction of a feature vector using the feature extractor parameters 208 are performed in the same manner as that explained in step S602.

This feature vector can be expected to be the feature vector of the face 305. The similarity between the extracted feature vector and the feature vector 303 of the query face 302 is calculated, and whether or not the face 305 is the same person as the query face 302 is determined according to whether or not the similarity is greater than a preset threshold value.

Thus, in the Third Embodiment, at each candidate position in an image to be searched, a high-resolution image is acquired by using the high-resolution image acquisition unit 1002. Then, a second feature vector is extracted by applying the feature vector extraction unit 202 to the high-resolution image, an arithmetic operation is performed between the first feature vector and the second feature vector, and it is determined whether or not the search target is present at the candidate position in the image to be searched.

Similar to the Second Embodiment, the Third Embodiment can significantly reduce face search time in a case in which a large number of small subjects are captured in the image to be searched. Furthermore, to perform highly accurate face recognition based on a high-resolution image, it becomes possible to determine whether a specific face is present with higher accuracy as compared to the Second Embodiment. Moreover, according to the image processing apparatus in each embodiment, it is possible to search for a predetermined subject at high speed in a case in which a large number of small subjects are present in an image to be searched and the like.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s).

The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium.

The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-179814, filed on Nov. 9, 2022, which is hereby incorporated by reference herein in its entirety.

What is claimed is:

1. An image processing apparatus comprising:
   one or more processors; and
   one or more memories that store a computer-readable instructions configured to be executed by the one or more processors, thereby the computer-readable instructions causing the image processing apparatus to:
   acquire a first image including a subject that is a search target, and a second image including a plurality of subjects, one of which may be the search target, from a camera or a storage device;
   extract a first feature vector that represents features of the search target included in the first image;
   extract a feature vector map that represents feature vectors of a subject at each position of the second image;
   perform an arithmetic operation based on the first feature vector and the feature vector map to obtain a heat map that represents the likelihood of a presence of the search target—at each position in the second image;
   estimate at least one candidate position in which the search target is likely to present in the second image, based on the heat map;
   extract a second feature vector that represents features of a subject located at the at least one candidate position;
   identify a position of the search target by determining whether the subject located at the at least one candidate position is the search target based on a similarity between the first feature vector and the second feature vector; and
   display the position of the search target,
   wherein when extracting the first feature vector, a feature vector extractor that has been trained in advance is used so that:
      feature vectors that are at a distance less than or equal to a predetermined value from each other are output for images of an identical subject, or subjects that belong to an identical class; and
      feature vectors that are at a distance greater than or equal to a predetermined value from each other are output for images of non-identical subjects, or subjects that do not belong to an identical class.

2. The image processing apparatus according to claim 1, wherein the subject includes a face.

3. The image processing apparatus according to claim 1, wherein when extracting the feature vector map, a feature vector extractor that has been trained in advance is used so that the difference in distance between a feature vector at the position of the subject and the first feature vector in the feature vector map becomes less than or equal to a predetermined value in a case in which the first image and the second image include an identical subject or subjects that belong to an identical class.

4. The image processing apparatus according to claim 3, wherein the feature vector extractor is trained based on pairs of an image and a ground truth feature vector map, and wherein when $K_w$ and $K_h$ are constants, the feature vector at the position $(x/K_w+\Delta x, y/K_h+\Delta y)$ of the ground truth feature vector map is calculated by multiplying a feature vector that can be obtained when an image that includes the subject at the position $(x, y)$ of the image is input to the feature vector extractor with a coefficient calculated based on $\Delta x$ and $\Delta y$.

5. The image processing apparatus according to claim 1, wherein in the estimation processing, the candidate positions in the second image are estimated based on positions in the heat map in which the value is a maximum and is equal to or greater than a threshold value.

6. The image processing apparatus according to claim 1, further configured to:
   acquire a subject image having a higher resolution than the second image,
   wherein the second feature vector is extracted based on the subject image.

7. An image processing method, comprising:
   acquiring a first image including a subject that is a search target, and a second image including a plurality of subjects, one of which may be the search target, from a camera or a storage device;
   extracting a first feature vector that represents features of the search target included in the first image;
   extracting a feature vector map that represents feature vectors of a subject at each position of the second image;
   performing an arithmetic operation based on the first feature vector and the feature vector map to obtain a heat map that represents the likelihood of a presence of the search target at each position in the second image;
   estimating at least one candidate position in which the search target is likely to present in the second image, based on the heat map;
   extracting a second feature vector that represents features of a subject located at the at least one candidate position;
   identifying a position of the search target by determining whether the subject located at the at least one candidate position is the search target based on a similarity between the first feature vector and the second feature vector; and
   displaying the position of the search target,
   wherein when extracting the first feature vector, a feature vector extractor that has been trained in advance is used so that:
      feature vectors that are at a distance less than or equal to a predetermined value from each other are output for images of an identical subject, or subjects that belong to an identical class; and feature vectors that are at a distance greater than or equal to a predetermined value from each other are output for images of non-identical subjects, or subjects that do not belong to an identical class.

8. A non-transitory computer-readable storage medium that stores a program for causing a computer to:
  acquire a first image including a subject that is a search target, and a second image including a plurality of subjects, one of which may be the search target, from a camera or a storage device;
  extract a first feature vector that represents features of the search target included in the first image;
  extract a feature vector map that represents feature vectors of a subject at each position of the second image;
  perform an arithmetic operation based on the first feature vector and the feature vector map to obtain a heat map that represents the likelihood of a presence of the search target at each position in the second image;
  estimate at least one candidate position in which the search target is likely to present in the second image, based on the heat map;
  extract a second feature vector that represents features of a subject located at the at least one candidate position;
  identify a position of the search target by determining whether the subject located at the at least one candidate position is the search target based on a similarity between the first feature vector and the second feature vector; and
  display the position of the search target,
  wherein when extracting the first feature vector, a feature vector extractor that has been trained in advance is used so that:
    feature vectors that are at a distance less than or equal to a predetermined value from each other are output for images of an identical subject, or subjects that belong to an identical class; and
    feature vectors that are at a distance greater than or equal to a predetermined value from each other are output for images of non-identical subjects, or subjects that do not belong to an identical class.

* * * * *